July 4, 1950  R. I. MARTIN  2,514,003
DRAFTING PENCIL
Filed Sept. 18, 1944
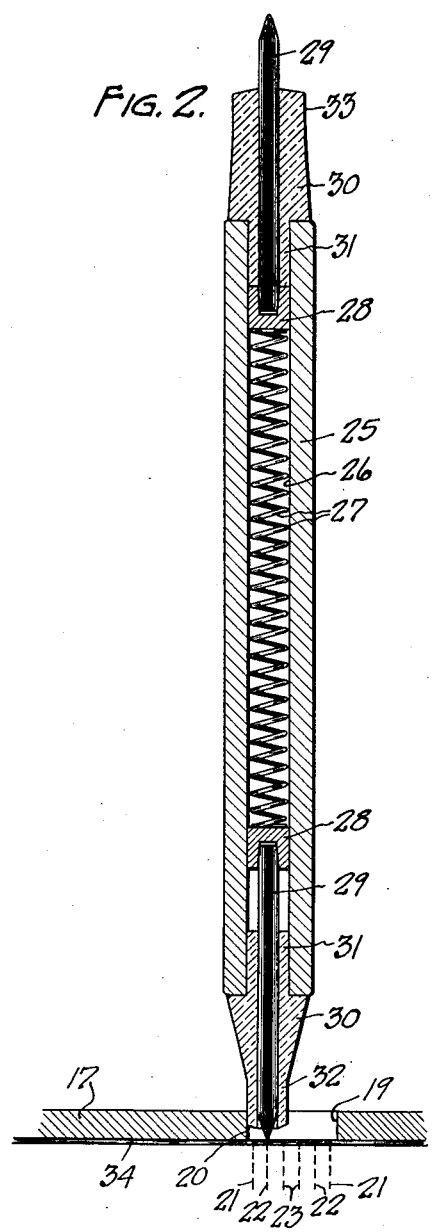
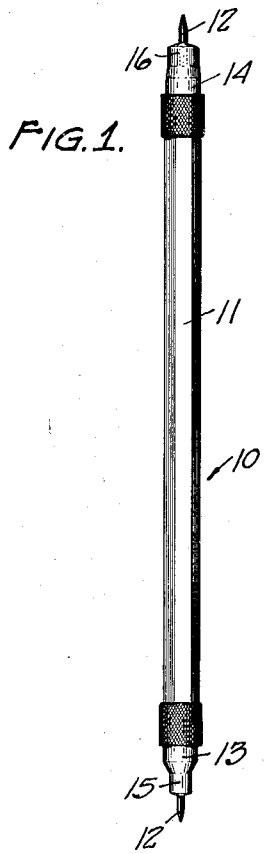
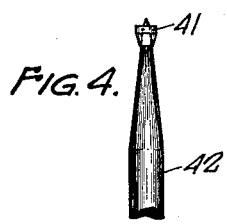
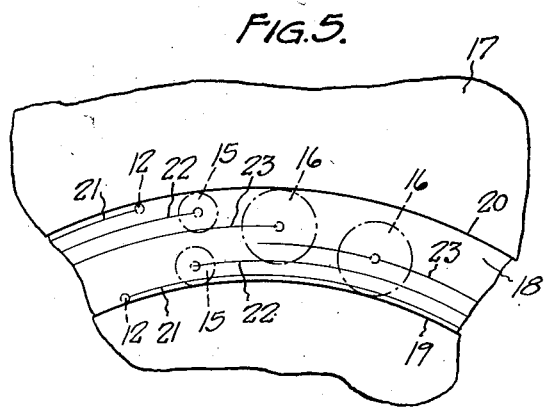
INVENTOR.
RAYMOND I. MARTIN.
BY Oltsch & Knoblock
        Attorneys.

Patented July 4, 1950

2,514,003

UNITED STATES PATENT OFFICE 2,514,003

DRAFTING PENCIL

Raymond I. Martin, German Township, St. Joseph County, Ind., assignor to Keuffel & Esser Company, Hoboken, N. J., a corporation of New Jersey Application September 18, 1944, Serial No. 554,563

4 Claims. (Cl. 120—9)

This invention relates to improvements in drafting pencils.

It is frequently necessary in drafting to make a series of lines which are spaced apart a predetermined small distance such as $\frac{1}{16}''$ or $\frac{1}{8}''$. The conventional practice in preparing to draw such lines is to measure the spacing therebetween with a ruler or measuring scale, and then to draw the lines from a guide, such as a T-square or a drafting triangle, which is moved and relocated for drawing each line.

Also, when drafting from a template, such as the template illustrated in the copending patent application of C. C. Stevason and myself, Serial No. 550,334, filed August 21, 1944, it sometimes happens that the template containing given designs or figures does not have a tracing edge or opening of the exact size desired. It is then necessary to lay out laboriously the design or figure desired by means of measuring scales and instruments other than the template, as compared to the rapid and simple operation which use of the template would permit if the proper size of the design was provided therein.

It is the primary object of this invention to provide a pencil constructed to simplify drafting under the above and similar conditions.

A further object is to provide a pencil provided with tips or end portions of predetermined and different sizes for locating the pencil lead an accurately measured distance from a guide engaged thereby.

A further object is to provide a pencil with guide or measuring means for accurately drawing lines in different selected spaced relations to each other and to a predetermined guide, edge or line.

Other objects will be apparent from the description, drawing and appended claims.

In the drawing:

Fig. 1 is a view of the pencil in side elevation.

Fig. 2 is an enlarged longitudinal sectional view of a modified embodiment of the pencil.

Fig. 3 is a fragmentary side elevation of one end of another modified embodiment of the invention.

Fig. 4 is a fragmentary side elevation of the other end of the Fig. 3 embodiment of the invention.

Fig. 5 is an enlarged plan view illustrating the use of the invention.

Referring to the drawing, and particularly to Fig. 1, the numeral 10 designates a mechanical pencil, having an elongated tubular casing 11 containing two sets of mechanisms for mounting two pencil leads 12. The mechanisms may be of any conventional or desired type, and preferably will be of the type by means of which lead may be propelled both inwardly and outwardly. Associated with the mechanism and carried by casing 11 are two end portions or heads 13 and 14 adapted, as by rotation thereof, to control the projection of the respective leads 12. Head 13 has a cylindrical end portion 15 of one exact predetermined diameter, and head 14 has a cylindrical end portion 16 of another and different predetermined diameter.

The diameters of portions 15 and 16 in each case are so calculated, with reference to the diameter of the lead 12, that lines drawn along a given fixed guide edge engaged respectively by the lead, by head 13 and by head 14 will be precisely spaced apart a predetermined distance. This usage of the pencil is best illustrated in Fig. 5 wherein a thin flat sheet of rigid material 17 forms a template provided with an elongated curved slot 18 of desired shape whose edges 19 and 20 are of predetermined dimension. Lines 21 can be drawn from edges 19 and 20 by guiding the lead 12 therealong. Lines 22 can be drawn from edges 19 and 20 by guiding the tip 15 of head 13 therealong. Line 23 can be drawn from edges 19 and 20 by guiding the tip of 16 of head 14 therealong. In the two last mentioned cases, the leads 12 will have been withdrawn to a position projecting only enough to permit them to mark a line, i. e., sufficiently to permit engagement of the tips 15 and 16 with the thin template member 17.

Assuming that the slot 18 provides a template for tracing elliptical or circular figures, as illustrated in the copending application of C. C. Stevason et al., Serial No. 550,334 aforementioned; and assuming further that lines 21 drawn from edges differ in dimension or diameter by $\frac{7}{16}''$; it will be observed that proper selection of the sizes of tips 15 and 16 will permit a series of similar figures to be drawn from the slot 18 which differ in size by $\frac{1}{16}''$ only. In other words, six different sizes of the figure can be drawn from the single slot 18. This permits a substantial simplification of a template, by reducing the number of guide edges required therein for a given range of figures, without substantial sacrifice of accuracy, and without requiring individual plotting or laying out of figures of sizes intermediate those for which guide edges are provided. Stated differently, if a figure of a size different from one provided by any of the slots 18 in the template is to be drawn, it may be done quickly and accurately by properly adjusting and positioning the pencil and using the proper slot edge as a guide.

Another embodiment of the invention is illustrated in Fig. 2. In this construction an elongated tubular member 25 forms the body of the pencil and its bore 26 forms a chamber receiving an elongated coil spring 27. A pair of chucks 28 bear against the opposite ends of spring 27 and are slidable in bore 26. Each chuck mounts an elongated lead 29. A head 30 is mounted detachably at each end of member 25, said heads being provided with reduced dimension inner end portions 31 each having a snug friction or "wring" fit in the end of the tubular body 25, and being shouldered to bear against the end of member 25. Leads 29 have snug sliding fits in axial bores of heads 30. Heads 30 terminate in cylindrical end portions or tips 32 and 33, respectively, of different predetermined diameters.

Spring 27 normally urges the chucks against the inner ends of the heads 30 so that leads 29 project from said heads to the maximum extent possible. To use the pencil to draw a line with the lead guided by one of the edges of the slot 18 of template 17, the pencil is held substantially perpendicular to the template with the lead engaging the guide edge. The body may then be pressed until the end of the tip of the lowermost head 30 bears upon the top face of the template 17, thereby increasing the pressure of the spring 27 on the lead sufficiently for marking purposes upon the underlying paper 34. The operation for obtaining a predetermined spaced relation between the tracing edge and the line being drawn, by the use of one of the heads 30, is the same as that described in reference to the Fig. 1 embodiment, except that adjustment of the extent of projection of the lead is automatic by virtue of the spring pressed mounting of the lead.

Another alternative embodiment of the invention is illustrated in Figs. 3 and 4. In this embodiment two collars 40 and 41 are mounted on the opposite ends of a double ended pencil 42. The collars are of different predetermined diameters and have tapered bores adaped for firm concentric fit upon the tapered ends of the pencil. The collars will preferably be fixedly mounted on the opposite tapered ends of a mechanical pencil of the type described with reference to Fig. 1. However, they may be mounted upon an ordinary lead pencil which has been sharpened at both ends, in which case they will be removable as is obvious.

While the use of the pencil to trace designs from template openings has been discussed, it is understood that this use is illustrative only. The drawing of spaced lines from a T-square or drafting triangle without movement of the latter and without measurement of spacing is also possible, as are other uses in drafting.

I claim:

1. A lead pencil adapted for use with a template in drafting, comprising a tubular housing, a lead, a guide portion at the end of said housing having a cylindrical tip portion with central hole to accommodate a lead, a lead mounting means in said housing and shiftable longitudinally in said housing, a compression spring back of said mounting means to project said lead a selected distance beyond said tip for engagement of said template by said lead in use, said lead mounting means including a chuck firmly anchoring said lead and having a sliding fit in said housing and cooperating with said housing to hold said lead in accurate predetermined concentric relation to said housing and said guide portion in all adjustments, said mounting means and spring permitting the lead to be pushed back for engagement of said templet by said guide portion.

2. A pencil adapted for use with a templet member, comprising a body, lead advancing means in said body including a chuck for accurately centering and longitudinally guiding said lead in said body in all adjustments, and an annular guide means secured to said body of predetermined transverse dimensions, said lead advancing means permitting the lead to be moved back for engagement of the templet by said annular guide means.

3. In a writing instrument for use with a templet member, writing means extending to one end of the writing instrument, a body member supporting said writing means, and annular guide means of predetermined transverse dimension secured to said body member and through which said writing means passes, said annular guide means having a surface for engaging the templet member so that the writing instrument will draw a line at a selected distance from the templet member.

4. An attachment for a writing instrument adapting it for use with a templet member comprising an annular guide member having an inner surface to receive the outer surface of the writing instrument and securely fit over the end of the writing instrument and having a predetermined transverse dimension for engaging the templet member so that the writing instrument will draw a line at a selected distance from the templet member.

RAYMOND I. MARTIN.

REFERENCES CITED

The following references are of record in the file of this patent:

UNITED STATES PATENTS

| Number | Name | Date |
|---|---|---|
| 381,877 | Hoffman | Apr. 24, 1888 |
| 1,097,238 | Krell | May 19, 1914 |
| 1,375,579 | Fischer et al. | Apr. 19, 1921 |
| 1,530,305 | Da Parma | Mar. 17, 1925 |

FOREIGN PATENTS

| Number | Country | Date |
|---|---|---|
| 22,290 of 1891 | Great Britain | Apr. 2, 1892 |